United States Patent
Greiner et al.

(10) Patent No.: US 7,150,891 B2
(45) Date of Patent: Dec. 19, 2006

(54) METHOD FOR CONDUCTING A COOKING PROCESS WITH A COOKING PROCESS PROBE

(75) Inventors: Michael Greiner, Freising (DE); Andrea Jürgena, Kirchheim (DE); Katharina Wallenwein, Weil (DE); Jürgen Klasmeier, Kaufering (DE); Jarosjay Klouda, Fürstenfeldbruck (DE); Rene Markus, Emmenhausen (DE); Christoph Reichmann, Landsberg (DE)

(73) Assignee: Rational AG, Landsberg/Lech (DE)

( * ) Notice: Subject to any disclaimer, the term of this patent is extended or adjusted under 35 U.S.C. 154(b) by 714 days.

(21) Appl. No.: 10/450,479

(22) PCT Filed: Dec. 11, 2001

(86) PCT No.: PCT/EP01/14509

§ 371 (c)(1),
(2), (4) Date: Jun. 12, 2003

(87) PCT Pub. No.: WO02/47522

PCT Pub. Date: Jun. 20, 2002

(65) Prior Publication Data

US 2004/0115325 A1 Jun. 17, 2004

(30) Foreign Application Priority Data

Dec. 12, 2000 (DE) .............................. 100 61 821

(51) Int. Cl.
*A23L 1/01* (2006.01)

(52) U.S. Cl. ...................... 426/233; 426/523; 219/494; 219/712

(58) Field of Classification Search ............... 426/231, 426/233, 523, 241–243; 99/325, 331–333, 99/337, 342, 344; 219/494, 712, 713
See application file for complete search history.

(56) References Cited

U.S. PATENT DOCUMENTS

| | | | | |
|---|---|---|---|---|
| 3,931,620 A | * | 1/1976 | Wellman et al. | 340/599 |
| 4,038,510 A | * | 7/1977 | White | 219/712 |
| 4,083,250 A | | 4/1978 | Goff et al. | |
| 4,230,731 A | * | 10/1980 | Tyler | 426/233 |
| 4,309,585 A | * | 1/1982 | Doi et al. | 219/720 |
| 4,320,285 A | * | 3/1982 | Koether | 219/497 |

(Continued)

FOREIGN PATENT DOCUMENTS

DE 31 19 496 12/1982

(Continued)

*Primary Examiner*—Drew Becker
(74) *Attorney, Agent, or Firm*—Marshall, Gerstein & Borun LLP (57) ABSTRACT

A method for managing a cooking process in a cooking chamber according to a cooking program with one cooking process probe inserted at least partially into a product to be cooked in the cooking chamber for the detection of at least two temperature values by at least two temperature sensors, includes a determination by the cooking process probe of temperature curves of a surface temperature $T_0$ of the product to be cooked, a core temperature KT of the product to be cooked, and/or a cooking chamber temperature. The method includes detection of a faulty insertion of the cooking process probe external to the product to be cooked by using recorded temperature curves, generation of at least one acoustic and/or optical warning signal, changing to an emergency program at least at such a time as the cooking process probe is arranged in the cooking chamber, and aborting the cooking program at least at such a time as the cooking process probe is arranged outside of the cooking chamber.

16 Claims, 5 Drawing Sheets

U.S. PATENT DOCUMENTS

| | | | |
|---|---|---|---|
| 4,350,858 A * | 9/1982 | Yoshida | 219/712 |
| 4,351,999 A * | 9/1982 | Nagamoto et al. | 219/705 |
| 4,639,578 A * | 1/1987 | Payne | 219/468.2 |
| 6,142,666 A | 11/2000 | Koether et al. | |
| 6,299,921 B1 * | 10/2001 | Loffler et al. | 426/233 |
| 6,753,027 B1 * | 6/2004 | Greiner et al. | 426/233 |
| 6,811,308 B1 * | 11/2004 | Chapman et al. | 374/155 |
| 7,102,107 B1 * | 9/2006 | Chapman | 219/494 |

FOREIGN PATENT DOCUMENTS

| | | |
|---|---|---|
| DE | 31 04 926 | 2/1983 |
| DE | 40 32 949 | 4/1992 |
| DE | 198 55 971 | 6/2000 |
| DE | 299 23 215 | 9/2000 |
| GB | 2 355 805 | 5/2001 |
| JP | 60-171316 | 9/1985 |
| JP | 62-175527 | 8/1987 |
| JP | 02-267421 | 11/1990 |
| JP | 2000-215977 | 8/2000 |
| JP | 2000-515959 | 11/2000 |

* cited by examiner

METHOD FOR CONDUCTING A COOKING PROCESS WITH A COOKING PROCESS PROBE

BACKGROUND OF THE INVENTION

The invention concerns a method for managing a cooking process in a cooking chamber according to a cooking program with a cooking process probe inserted at least partially into a product to be cooked in the cooking chamber to detect at least two temperature values by means of at least two temperature sensors, comprising a detection of temperature curves detected by the cooking process probe of a surface temperature $T_0$ of the product to be cooked, and a core temperature KT with a cooking process probe, and/or a cooking chamber temperature.

Methods are known with which the further process management of a cooking event is derived from a detected core temperature of a product to be cooked, in particular in the form of a cut of meat. However, these methods lead to unsatisfactory and irreproducible cooking results when the sensor for detecting the core temperature is not exactly positioned in the core of the piece of meat, and thus the temperature in another part of the product to be cooked is detected instead of the temperature of the core.

Therefore, cooking process probes for managing a cooking process were developed, with which a plurality of temperatures could be detected inside a product to be cooked, and at least one further temperature outside the product to be cooked, preferably on the surface of the product to be cooked; see DE 299 23 215 U1. Given the temperature detected in the product to be cooked, the core temperature of the product to be cooked can be determined during cooking through extrapolation from the corresponding time curves, even if the cooking process probe was not exactly positioned in the core. Thus, a cooking process can be reproducibly controlled, and its duration predetermined, by employing a known cooking process probe that was inserted into a product to be cooked. However, the known cooking process probe contains no possibility of detecting whether the cooking process probe was inserted into the product to be cooked at all or if, inadvertently by faulty operation, it was placed in the cooking chamber outside of the product to be cooked, or outside the cooking chamber altogether. In such cases, the faulty insertion results in irrelevant and nonsensical temperature values for the cooking process management that will mismanage the cooking process if they are consulted for the cooking process management.

An indication device provided at a cooking process probe is known from DE 31 04 926 C2, with which the resistance value of a product to be cooked is measured and compared with a default reference value. If the difference between the measured resistance value and the reference value exceeds a predetermined threshold, it is reasoned that the cooking process probe is not located in the product to be cooked, and the cooking process is aborted or terminated. However, the disadvantage with this cooking process probe is that, in addition to the temperature sensor, the indication device and its appertaining processing devices are necessary for determining the resistance value, and that the determination of the default value, as well as the threshold value, is afflicted with a certain unreliability that can itself lead to an unnecessary termination of the cooking process.

Furthermore, a diagnostic system for monitoring of cooking profiles is known from U.S. Pat. No. 6,142,666 that, in addition to a display, enables storage of thermal signatures or characteristics during an operational mode of a cooking device. These thermal signatures or characteristics are measured by a temperature sensor (that is also used to regulate the cooking temperature), collected, and then saved in a table. The diagnostic system determines whether the cooking device is working under normal operating conditions from the saved thermal signatures, that preferably exhibit the first or even higher temperature derivations. It can also be provided that overall cooking profiles are acquired, graphically presented, and compared with a reference cooking profile, on the one hand to indicate the condition of the product to be cooked, and on the other hand to differentiate by means of the diagnostic system with the default profile between normal and incorrect cooking conditions. However, what is disadvantageous with this diagnostic system is that only the temperature of a cooking medium can be measured by the temperature sensor, and not that of the product to be cooked. Furthermore, the diagnostic system can not identify a specific faulty operation, in particular an incorrect arrangement of the temperature system, in order to undertake appropriate control of the cooking device. Furthermore, the diagnostic system requires an extensive electronic circuit, including storage units, that raises the cost of the diagnostic system.

Moreover, a method for the monitoring of a temperature sensor for an automatic transmission of a motor vehicle is disclosed in DE 198 55 971 A1. In this method, either the offset error of the temperature sensor during a cold start is determined by forming the difference relative to a comparison temperature (for example, the motor temperature or the outside temperature) and the temperature value measured by the temperature sensor, or, upon reaching a predetermined limit temperature, the temporal derivation of the values supplied by the temperature sensor is generated, and it is checked whether these lie within preset boundary values. However, what is disadvantageous with this method is that, as before, it is not possible to determine an error type of the temperature sensor, rather only to observe an overall deviation from a normal behavior.

SUMMARY OF THE INVENTION

The object of the invention is therefore to improve the method of the species in such a way that the disadvantages of the prior art are overcome, in particular to determine and deal with a non-ensuing or an incorrectly ensuing insertion of the cooking process probe into the product to be cooked.

This object is inventively achieved by detecting a faulty insertion of the cooking process probe outside of the product to be cooked, by using the acquired temperature curves and generation of at least one warning signal, acoustic and/or optical in nature, changing to an emergency program at least when the cooking process probe is arranged in the cooking chamber, and aborting the cooking program when the cooking process probe is arranged outside the cooking chamber.

A first, preferred embodiment of the invention is characterized in that the determination of temperature curves comprises the determination of first derivations of the surface temperature $T_0$ as well as the core temperature KT according to the time t; and the detection of a faulty insertion comprises an ascertainment of a faulty insertion in a preheating phase, when the first derivations of the surface temperature $T_0$ as well as the core temperature KT according to the time t exhibit a gradient, and the difference between the core temperature KT and the surface temperature $T_0$ at a first point in time $t_1$ after the beginning of the preheating process is lower than a first threshold $\Delta T_1$; or when the derivations of the surface temperature $T_0$ as well as the core temperature KT according to the time t exhibit identical gradients; and/or a determination of a faulty insertion in a incipient roasting phase, when the first derivations of the surface temperature $T_0$ as well as the core temperature KT based on the time t exhibit no gradient, and the difference between the surface temperature $T_0$ and the core temperature KT at a second point in time $t_2$ after the beginning of the roasting process is lower than a second threshold $\Delta T_2$ that preferably corresponds to the first threshold $\Delta T_1$; or when the derivations of the surface temperature $T_0$ and the core temperature KT both exhibit a positive gradient based on the time.

It can thereby by provided that the incipient roasting phase is not substantially influenced in the emergency program, a cooling phase follows the incipient roasting phase, during which management of the cooking process proceeds dependently upon the cooking chamber temperature GT, until the cooking chamber temperature GT reaches a first threshold $GT_1$; and a holding phase follows the cooling phase, during which management of the cooking process proceeds dependently on the cooking chamber temperature GT, whereby the cooking chamber temperature GT is regulated to a rated value of the core temperature $KT_{rated}$+2–15°.

Furthermore, it is proposed with the invention that, given a definite faulty insertion, the emergency program be ended and revert to the cooking program after opening a door to the cooking chamber, in particular during the incipient roasting phase.

A second, preferred embodiment of the invention is characterized in that the determination of temperature curves comprises a determination of first derivations of the core temperature KT, as well as the surface temperature $T_0$ according to the time, and the determination of a faulty insertion comprises an ascertainment of a faulty insertion from the n derivations most recently formed before arrival at a third point in time $t_3$, whereby $n \epsilon N$ and the third point in time $t_3$ exists upon reaching a second threshold $GT_2$ of the cooking chamber temperature, or by expiration of a predetermined time span, in which in particular the cooking chamber temperature GT exhibits the second threshold $GT_2$, when the first derivations of the core temperature KT, as well as the surface temperature $T_0$ according to the time, do not exhibit a gradient, and the difference between the surface temperature $T_0$ and the core temperature KT at a fourth point in time $t_4$ after the beginning of the program is lower than a third threshold $\Delta T_3$, or when the first derivations of the core temperature KT, as well as the surface temperature $T_0$ according to the time, exhibit identical gradients.

Furthermore, it is proposed with the invention that, in a case where it is determined that no faulty insertion has occurred, a fault function is identified, and at least one optical and/or acoustic warning signal is generated, after detection of fast fluctuations of the core temperature KT, in particular up to approximately +30/−30° C. during the course of the cooking.

Inventively, it can also be provided that the cooking program is aborted in the event of an identified malfunction.

A third, preferred embodiment of the invention is characterized in that the determination of a faulty insertion comprises an ascertainment of a faulty insertion when the difference between the surface temperature $T_0$ and the cooking chamber temperature GT is higher than a fourth threshold $\Delta T_4$ at a fifth point in time $t_5$.

It can thereby be provided that, in the event of a definitive faulty insertion, first derivations of the surface temperature $T_0$ are determined and it is ascertained that the cooking process probe is located in the cooking chamber when the first derivations of the surface temperature $T_0$ are not equal to zero; and otherwise it is located outside of the cooking chamber, and the cooking program aborted, when the cooking process probe is determined to be arranged outside of the cooking chamber; and the cooking program transferred to an emergency program, when the cooking process probe is determined to be arranged inside the cooking chamber.

Finally, it is proposed with the invention that the cooking chamber temperature GT be measured with a sensor independent of the cooking process probe.

By transmitting the warning signals in the event that a faulty insertion is determined, it should be possible for an operator of a cooking device to recognize and remedy the operation error early on, namely in the form of a cooking process probe not inserted into a product to be cooked, so that the cooking process can be controlled in a known manner on the basis of the temperature values detected by the cooking process probe, and therewith can achieve optimal cooking results. Furthermore, by automatically detecting a malposition of the cooking process probe and recognizing the type of malposition, a malfunction of the cooking process on the basis of temperature values determined by a cooking process probe that is not inserted in the product to be cooked, or that is located outside of the cooking chamber, is avoided, namely by changing over from the cooking program to an emergency program when the cooking process probe is determined to be located outside of the cooking chamber. Protection against overheating is thereby also ensured.

Further features and advantages ensue from the following detailed specification of exemplary embodiments of the invention, with reference to the attached schematic drawings.

DESCRIPTION OF THE PREFERRED EMBODIMENTS

Figure 1:
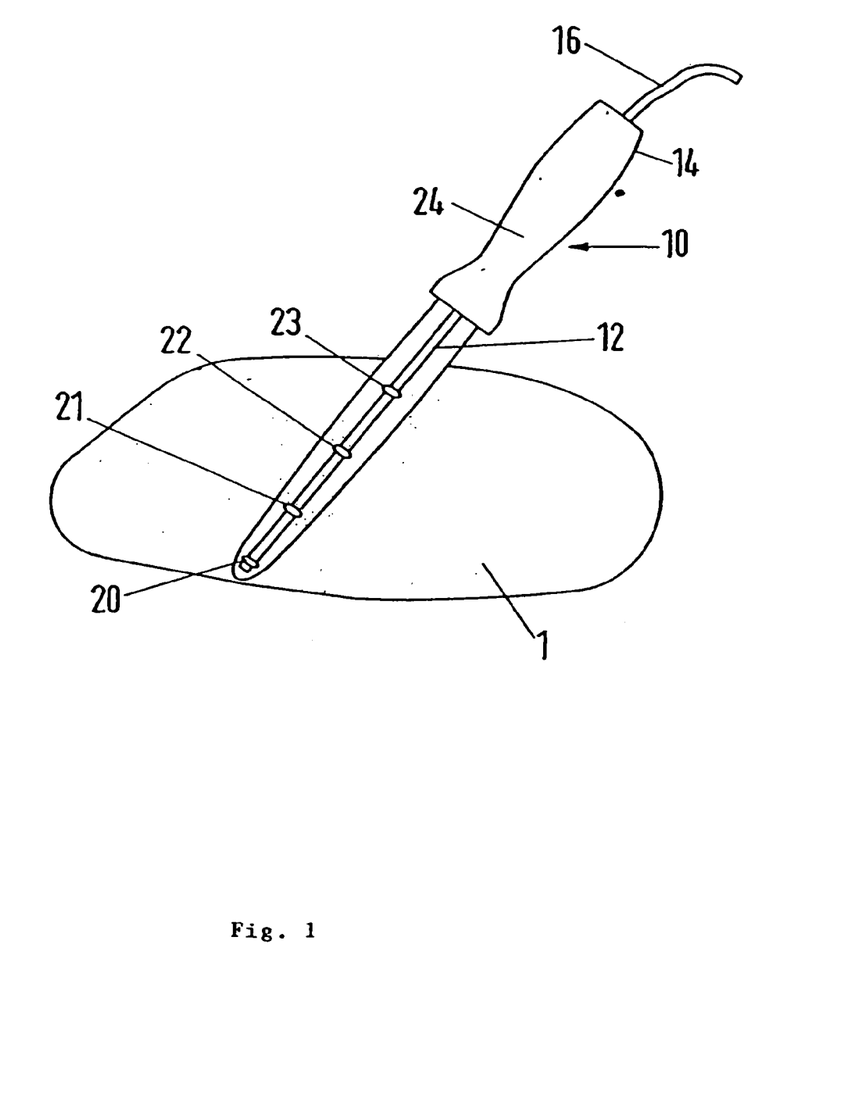
FIG. 1 is a schematic presentation of a cooking process probe used for the method of the present invention in a product to be cooked.

In FIG. 1, a cooking process probe useable for the method of the present invention is presented that comprises a point or blade 12, a grip 14, and a cable 16, whereby the tip of the blade 12 is insertable into a product 1 to be cooked. In the region of the tip 12, four temperature sensors 20, 21, 22, 23 are arranged that detect the temperature in the product 1 to be cooked, while an additional fifth temperature sensor 24 for detecting the temperature in the product 1 to be cooked, preferably on its surface, is located in the grip 14. An analyzing unit (not shown) for detected temperature values is integrated into the cooking process probe 10. This analyzing unit is, for its part, connected with a controller (not shown) for the cooking device. Since, with the present cooking process probe 10, more than one temperature can be detected in the product 1 to be cooked, and one further temperature can be detected on the product 1 to be cooked, the real core temperature of the product 1 to be cooked can be determined from the temperature curve of the temperature difference values detected with the temperature sensors 20–24, for example by extrapolation, even when the cooking process probe 10 is not stuck exactly through the core of the product 1 to be cooked, as described in DE 299 23 215.8. The core temperature KT and surface temperature $T_0$ determined with the cooking process probe 10 can be drawn on to recognize a faulty operation of the cooking process probe 10, in particular a faulty insertion, as explained in the following.

Figure 2A:
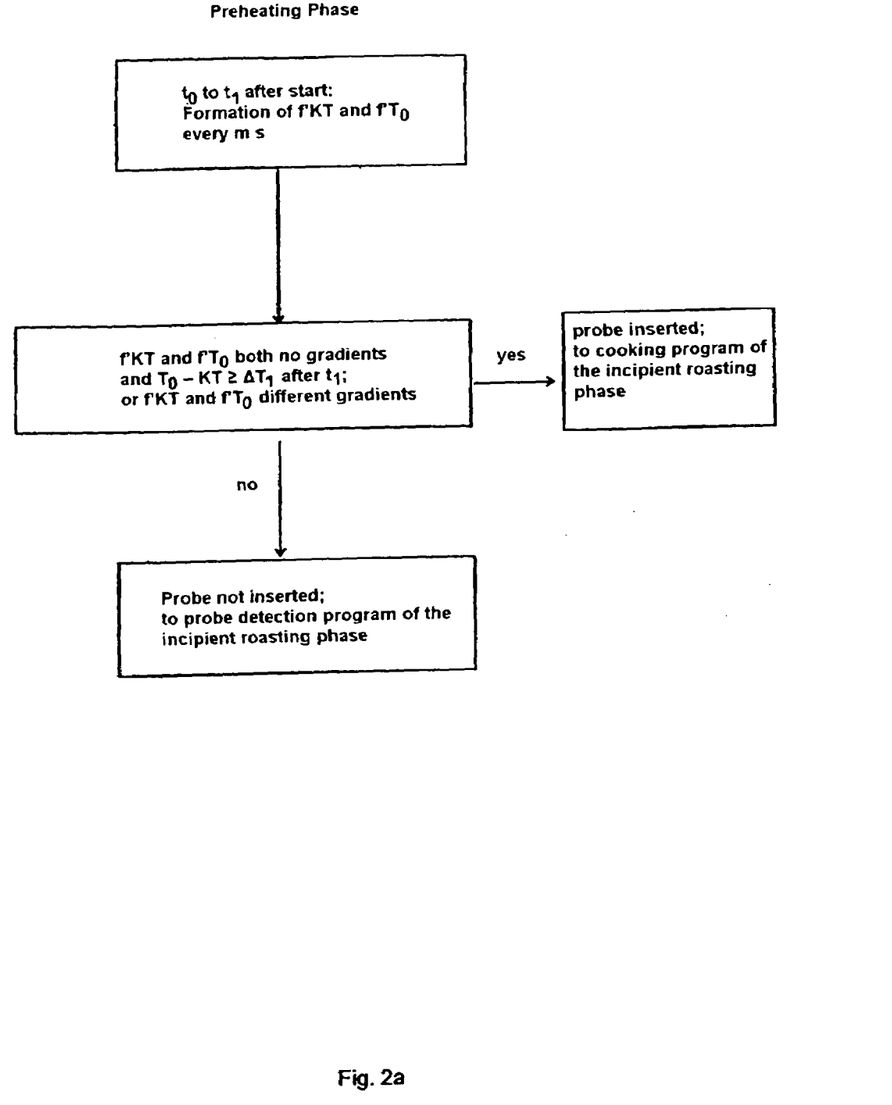
FIGS. 2a and 2b are, in each case, a flow chart for a first embodiment of the inventive method.

According to a first preferred embodiment of the invention, whether or not the cooking process probe 10 is inserted into a product 1 to be cooked is detected during a preheating phase (as shown in FIG. 2*a*). The evaluation unit creates a first derivation f'KT of the determined core temperature KT and a first derivation f'$T_0$ of the detected surface temperature $T_0$ according to the time in the approximation according to a difference quotient, on the basis of the temperature values recorded every m seconds by the temperature sensors 20–24 at a point in time $t_o$ after the start of a heating of a cooking chamber (not shown), whereby the surface temperature $T_0$ is detected by temperature sensor 24, and the core temperature KT is determined by extrapolation from the temperature values measured by temperature sensors 20–23. If the result is that the first derivations f'Kt, f'$T_0$ of the determined core temperature KT as well as the detected surface temperature $T_0$, exhibit no gradient after a time duration $t_1$, and simultaneously the difference between the detected surface temperature $T_0$ and the determined core temperature KT is higher than or equal to a first threshold •$T_1$ at a point in time $t_1$ after the start of the hot-air heating, or in the case that the first derivations f'Kt, f'$T_0$ of the determined core temperature KT as well as the detected surface temperature $T_0$ exhibit different gradients, it stands to reason that the cooking process probe was correctly inserted in the preheating phase, and that it can be changed to the incipient roasting phase without requiring a new ascertainment of the probe. Otherwise a conclusion is drawn about the presence of a faulty insertion.

Figure 2B:
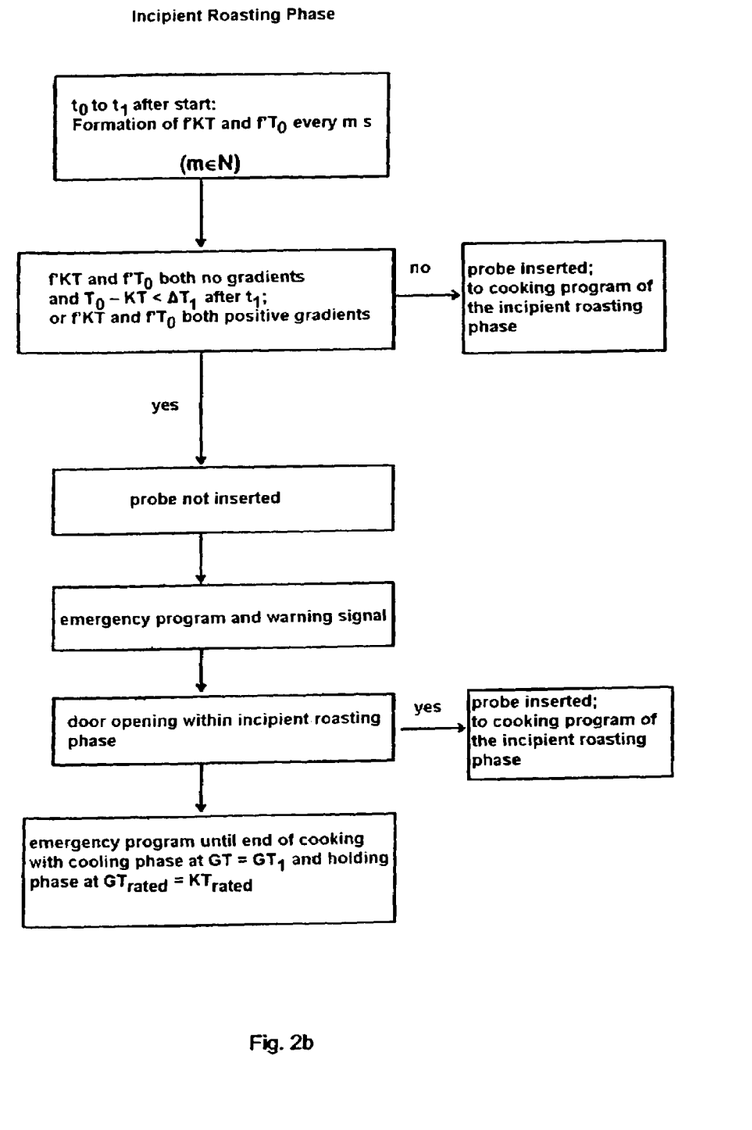

If it is determined during the preheating phase that the cooking process probe is not inserted into the product to be cooked, or should the preheating phase be omitted, then the ascertainment of whether or not the cooking process probe is inserted into the product to be cooked ensues in the incipient roasting phase, as presented in FIG. 2*b*. Therein again, at a point in time $t_0$ after the beginning of the incipient roasting phase, every m seconds a first derivation f'KT of the determined core temperature KT and a first derivation f'$T_0$ of the detected surface temperature $T_0$ based on the time will be generated in the approximation by a difference quotient. If it results that the first derivations f'KT, f'$T_0$ of the determined core temperature KT and the detected surface temperature $T_0$ exhibit no gradients, and simultaneously the difference between the detected surface temperature $T_0$ and the determined core temperature KT at a point in time $t_2$ after the beginning of the incipient roasting phase is lower than a second threshold $\Delta T_2$, or if the derivations f'KT, f'$T_0$ of the determined core temperature KT and the detected surface temperature $T_0$ both exhibit positive gradients, it stands to reason that the cooking process probe was also not inserted in the incipient roasting phase. Otherwise, a correct insertion of the cooking process probe into the product to be cooked is assumed.

Given a faulty insertion in the incipient roasting phase, a switch is made to an emergency program in order to prevent the cooking program from malfunctioning due to the use of mistakenly determined values that are therefore irrelevant to the cooking process management. Simultaneously, an alarm message will be produced as acoustic signals, as in the form of beeps, and optical signals in the form of blinking words "SENSOR" and "POSITION" on a clock or, respectively, cooking temperature display (not shown) of the cooking device. The warning signal occurs during the entire emergency program.

If it occurs that, due to the aforementioned warning signal, the door (not shown) to the cooking chamber is opened during the incipient roasting phase, whereby it is then assumed that the cooking process probe is subsequently properly inserted by an employee into the product to be cooked, thus the cooking program is controlled in a known manner by agency of temperature values and temperature curves detected by the henceforth presumably properly inserted cooking process probe.

If the faulty insertion is first recognized after the incipient roasting phase, the emergency program will be continued even in if the cooking process probe is belatedly inserted into the product to be cooked, since a meaningful correction is now no longer possible.

The emergency program is characterized in that the incipient roasting phase is normally followed by a subsequent cooling phase, in which the cooking chamber temperature GT is utilized for management of the cooking process until it has reached a first threshold $GT_1$—a "done" phase that inherently follows is skipped—and during a subsequent holding phase the cooking chamber temperature GT is not regulated on the basis of the current core temperature detected by the cooking process probe, but rather on the basis of a rated target core temperature $KT_{rated}$ plus an additive value; for example, $KT_{rated}+2-15°$ C.

Figure 3:
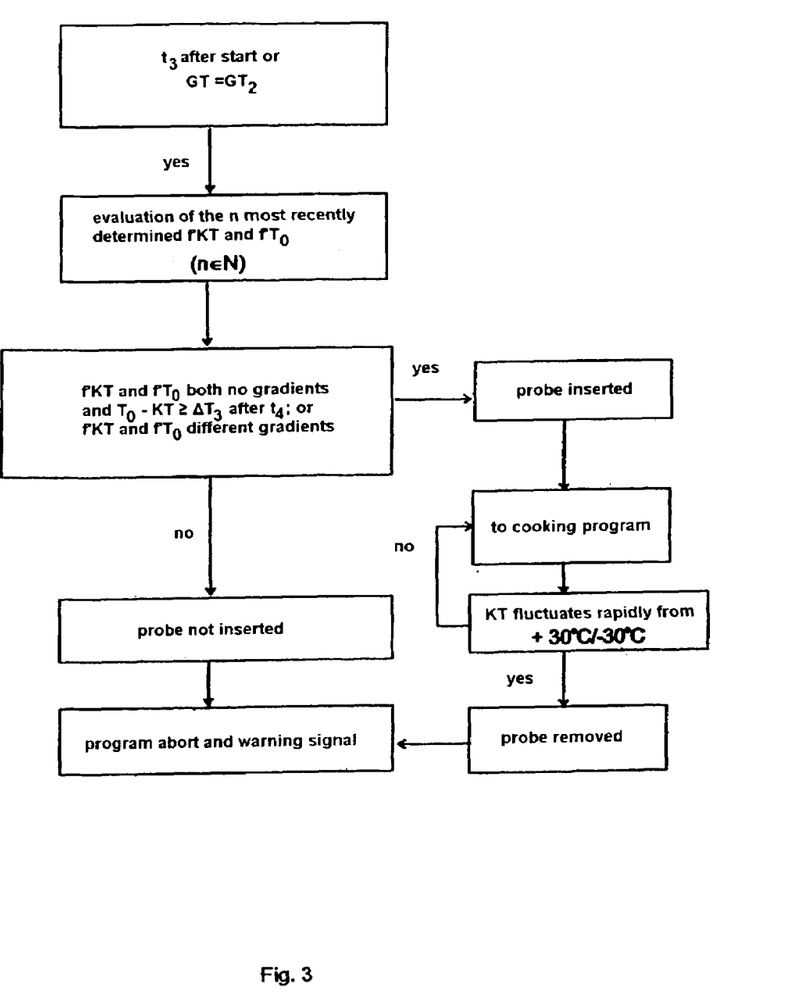
FIG. 3 is a flow chart for a second embodiment of the inventive method.

In an alternative, second exemplary embodiment of the inventive method that is presented in FIG. 3, whether or not the cooking process probe is inserted into the product to be cooked is already identified at the start of the program. Thereby, starting from the point in time that the cooking chamber door is closed or, respectively, the first derivations f'KT, f'$T_0$ of the detected core temperature KT and the surface temperature $T_0$ detected by the temperature sensor 24 according to the time are generated in the approximation by a difference quotient, whereby the core temperature KT is again derivable from the temperature values detected by the temperature sensors 20–23 in the product to be cooked.

When a threshold $GT_2$ is reached, as detected by a temperature sensor (not shown) independent of the cooking process probe, or, in the case that the cooking chamber already exhibits the temperature of the threshold $GT_1$ at the start of the program, the n derivations f'KT, f'$T_0$ that were most recently formed are evaluated and drawn on to identify the probe insertion after the expiration of a time duration $t_3$. If the first derivations f'KT, f'$T_0$ of the determined core temperature KT as well as the detected surface temperature $T_0$ according to the time thereby exhibit no gradient, and at the same time the difference between the detected surface temperature $T_0$ and the determined core temperature KT at a point in time $t_4$ after the start of the program is higher or equal to a third threshold $\Delta T_3$, or if the first derivations f'KT, f'$T_0$ of the determined core temperature KT as well as the detected surface temperature $T_0$ according to the time thereby exhibit different gradients, it is assumed that the cooking process probe 10 is correctly inserted into the product to be cooked, and the cooking process can be controlled in a known way by a cooking program under utilization of the determined core temperature KT. In all other cases it is assumed that the cooking process probe is not correctly inserted into the product to be cooked.

Given a faulty insertion, the optical and acoustic signals already cited in connection with the first embodiment are output, at least until the cooking chamber door of the cooking chamber is opened in order to remedy the faulty insertion. The cooking program is aborted simultaneously with the recognition that the cooking process probe is not inserted into the product to be cooked.

If, given that the cooking process probe was originally detected to be correctly inserted, it is established during the further course of the cooking that the current core temperature KT determined by the cooking process probe rapidly fluctuates by up to approximately +30° C./−30° C., it is concluded therefrom that the cooking process probe was pulled out or broken during the course of the cooking. In this case, the cooking program is likewise aborted, and the optical and acoustic signals already cited will be output until the door is opened.

Figure 4:
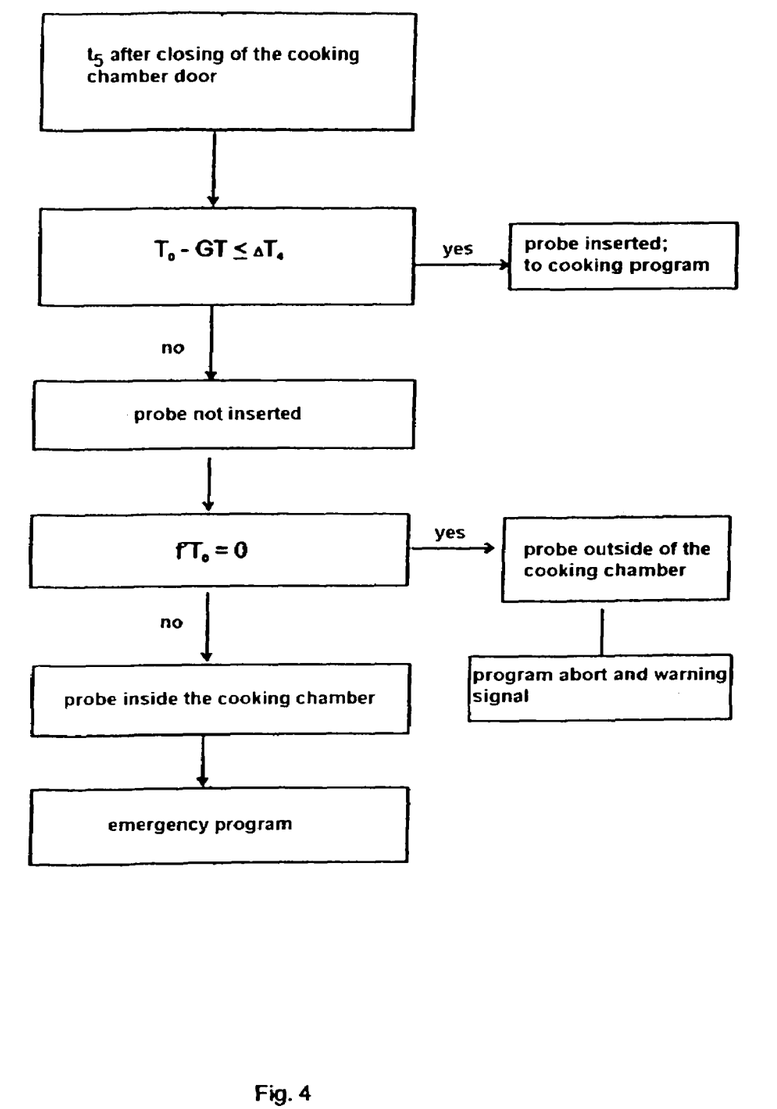
FIG. 4 is a flow chart for a third embodiment of the inventive method.

According to a third embodiment of the invention that is presented in FIG. 4, in a further alternative program sequence, the surface temperature $T_0$ detected by the temperature sensor 24 of the product to be cooked is reviewed and compared with a further cooking chamber temperature GT detected by a temperature sensor (not shown) after a time duration $t_5$ after the cooking chamber door is closed. If the difference between the detected surface temperature $T_0$ of the product to be cooked and the detected cooking chamber temperature GT is higher than a fourth threshold $\Delta T_4$, it is assumed that the cooking process probe 10 is incorrectly inserted into the product 1 to be cooked. In all other cases it is assumed that the cooking process probe is correctly inserted.

Given a faulty insertion, it is examined whether the cooking process probe is located in the cooking chamber or outside the cooking chamber. If the detected surface temperature $T_0$ does not increase in spite of constant increases in heat, it stands to reason that the cooking process probe is located outside of the cooking chamber, wherefore the cooking program is then aborted simultaneously with the output of warning signals that are acoustic and/or optical in nature. If the cooking process probe is incorrectly inserted, and it is identified that the cooking process probe is not outside of the cooking chamber, thus is located in the cooking chamber, the cooking program is brought to an end in the shortest amount of time by emergency regulation upon utilization of the temperature sensors provided in the cooking chamber that are independent of the cooking process probe. Again, the emergency regulation ensues in connection with the output of acoustic and optical signals.

Both individually as well as in any arbitrary combination, in the features of the invention disclosed in the above specification, in the claims, and in the drawings can be critical for realizing the various embodiments.

We claim:

1. In a method for managing a cooking process in a cooking chamber according to a cooking program with at least one cooking process probe with at least two temperature sensors to detect at least two temperature values while the probe is partially inserted into a product to be cooked in the cooking chamber and including determining by the cooking process probe at least two temperature curves selected from a group consisting of a surface temperature $T_0$ of the product to be cooked, a core temperature KT of the product to be cooked and a cooking chamber temperature, the improvements comprising detecting an existence of a faulty insertion of the cooking probe outside of the product to be cooked by using the recorded temperature curves and determining if the probe is still arranged in the cooking chamber or is arranged outside of the cooking chamber, generating at least one warning signal selected from an acoustical signal, an optical signal and a combination of acoustical and optical signals, if a faulty insertion is detected, at a minimum changing to an emergency program when the cooking process probe is determined to be arranged in the cooking chamber, and at a minimum aborting the cooking program when the cooking process probe is determined to be arranged outside of the cooking chamber.

2. In a method according to claim 1, wherein the step of determining the temperature curves comprises a determination of first derivations of the surface temperature $T_0$ and the core temperature KT according to a time t and the step of detecting an existence of a faulty insertion comprises one of ascertaining a faulty insertion in a preheating phase either when the first derivations of the surface temperature $T_0$ and the core temperature KT according to the time t exhibits a gradient and the difference between the core temperature KT and the surface temperature $T_0$ at a first point in time $t_1$ after the beginning of the preheating process is lower than a first threshold $\Delta T_1$, or when the derivations of the temperature $T_0$ and the core temperature KT according to the time t exhibits identical gradients, and ascertaining of a faulty insertion in an incipient roasting phase either when the first derivations of the surface temperature $T_0$ and the core temperature KT according to the time t exhibits no gradient and the difference between the core temperature KT and the surface temperature $T_0$ at a second point in time $t_2$ after the beginning of the roasting process is lower than a first threshold $\Delta T_2$ that preferably corresponds to a first threshold $\Delta T_1$ or when the derivations of the surface temperature $T_0$ and the core temperature KT according to the time t both exhibit a positive gradient.

3. In a method according to claim 2, wherein, during the emergency program the incipient roasting phase is not substantially affected, the emergency program includes a cooling phase following the incipient roasting phase, during which management of the cooking program occurs dependent upon the cooking chamber temperature GT, until the cooking chamber temperature GT reaches a first threshold $GT_1$ and the cooling phase is succeeded by a holding phase, during which management of the cooking process occurs dependent upon the cooking chamber temperature GT, whereby the cooking chamber temperature GT is regulated on a target value of the core temperature $KT_{rated}+2-15°$ C.

4. In a method according to claim 1, which, in the case of a faulty insertion, includes ending the emergency program and reverting to a cooking program after a door of the cooking chamber is opened, in particular during an incipient roasting phase.

5. In a method according to claim 4, wherein the step of determining a faulty insertion comprises ascertaining a faulty insertion when the difference between the surface temperature $T_0$ and the cooking chamber temperature GT is higher than a fourth threshold $\Delta T_4$ at a fifth point in time $t_5$.

6. In a method according to claim 5, wherein, given a defined faulty insertion, determining and verifying a first derivation of the surface temperature $T_0$, when the first derivation of the surface temperature $T_0$ is not equal to zero, whether the cooking process probe is located in the cooking chamber or if the cooking process probe is located outside of the cooking chamber and transferring the cooking program to the emergency program when the cooking process probe is determined to be arranged inside the cooking chamber.

7. In a method according to claim 1, wherein the step of determining the temperature curves comprises determination of first derivations of the core temperature KT and the surface temperature $T_0$ according to the time t and the detecting of a faulty insertion comprises determining the ascertainment of a faulty insertion from either when the n derivations most recently formed before arrival at a third point in time $t_3$, whereby nϵN and the third point in time $t_3$ exists upon the arrival of the cooking chamber temperature at a second threshold $GT_2$; when an expiration of a predetermined time span, in which the particular cooking chamber temperature $GT_2$ exhibits a second threshold $GT_2$ when the first derivations of the core temperature KT and the surface temperature $T_0$ according to the time t do not exhibit a gradient, and the difference between the surface temperature $T_0$ and the core temperature KT at a fourth point in time $t_4$ after the beginning of the program is lower than the third threshold $\Delta T_3$; or when the first derivations of the core temperature KT and the surface temperature $T_0$ according to the time t exhibits identical gradients.

8. In a method according to claim 1, wherein, given a defined non-faulty insertion, recognizing a malfunction during the course of cooking and generating at least one warning signal selected from an optical signal, an acoustical signal and optical and acoustical warning signals after detection of a rapid fluctuation of the core temperature KT in a range of approximately +30° C. and −30° C.

9. In a method according to claim 8, wherein the step of determining a faulty insertion comprises ascertaining a faulty insertion when the difference between the surface temperature $T_0$ and the cooking chamber temperature GT is higher than a fourth threshold $\Delta T_4$ at a point of time $t_5$.

10. In a method according to claim 9, wherein, given a definite faulty insertion, determining and verifying by a first derivation of the surface temperature $T_0$, when the first derivations of the surface temperature $T_0$ are not equal to zero, whether the cooking process probe is located in the cooking chamber or if the cooking process probe is located outside of the cooking chamber and transferring the cooking program to an emergency program when the cooking process probe is determined to be arranged inside the cooking chamber.

11. In a method according to claim 1, which includes aborting the cooking program in the event of a definite malfunction.

12. In a method according to claim 11, wherein the step of determining the faulty insertion includes ascertaining a faulty insertion when the difference between the surface temperature $T_0$ and the cooking chamber temperature GT is higher than a fourth threshold $\Delta T_4$ at a fifth point in time $t_5$.

13. In a method according to claim 12, wherein, given a definite faulty insertion, determining and verifying by a first derivation of the surface temperature $T_0$, when the first derivations of the surface temperature $T_0$ are not equal to zero, whether the cooking process probe is located in the cooking chamber or if the cooking process probe is located outside of the cooking chamber and transferring the cooking program to an emergency program when the cooking process probe is determined to be arranged inside the cooking chamber.

14. In a method according to claim 1, which includes measuring the cooking chamber temperature GT with a sensor independent of the cooking process probe.

15. In a method according to claim 1, wherein the step of determining a faulty insertion comprises ascertaining a faulty insertion when the difference between the surface temperature $T_0$ and the cooking chamber temperature GT is higher than a fourth threshold $\Delta T_4$ at a fifth point in time $t_5$.

16. In a method according to claim 15, wherein, given a definite faulty insertion, determining and verifying by a first derivation of the surface temperature $T_0$, when the first derivations of the surface temperature $T_0$ are not equal to zero, whether the cooking process probe is located in the cooking chamber or if the cooking process probe is located outside of the cooking chamber and transferring the cooking program to an emergency program when the cooking process probe is determined to be arranged inside the cooking chamber.

* * * * *